Jan. 31, 1939.    M. F. MacBRIDE    2,145,401
TESTING GAUGE FOR MOTOR VEHICLE FUEL PUMPS
Filed Nov. 9, 1937    3 Sheets-Sheet 2
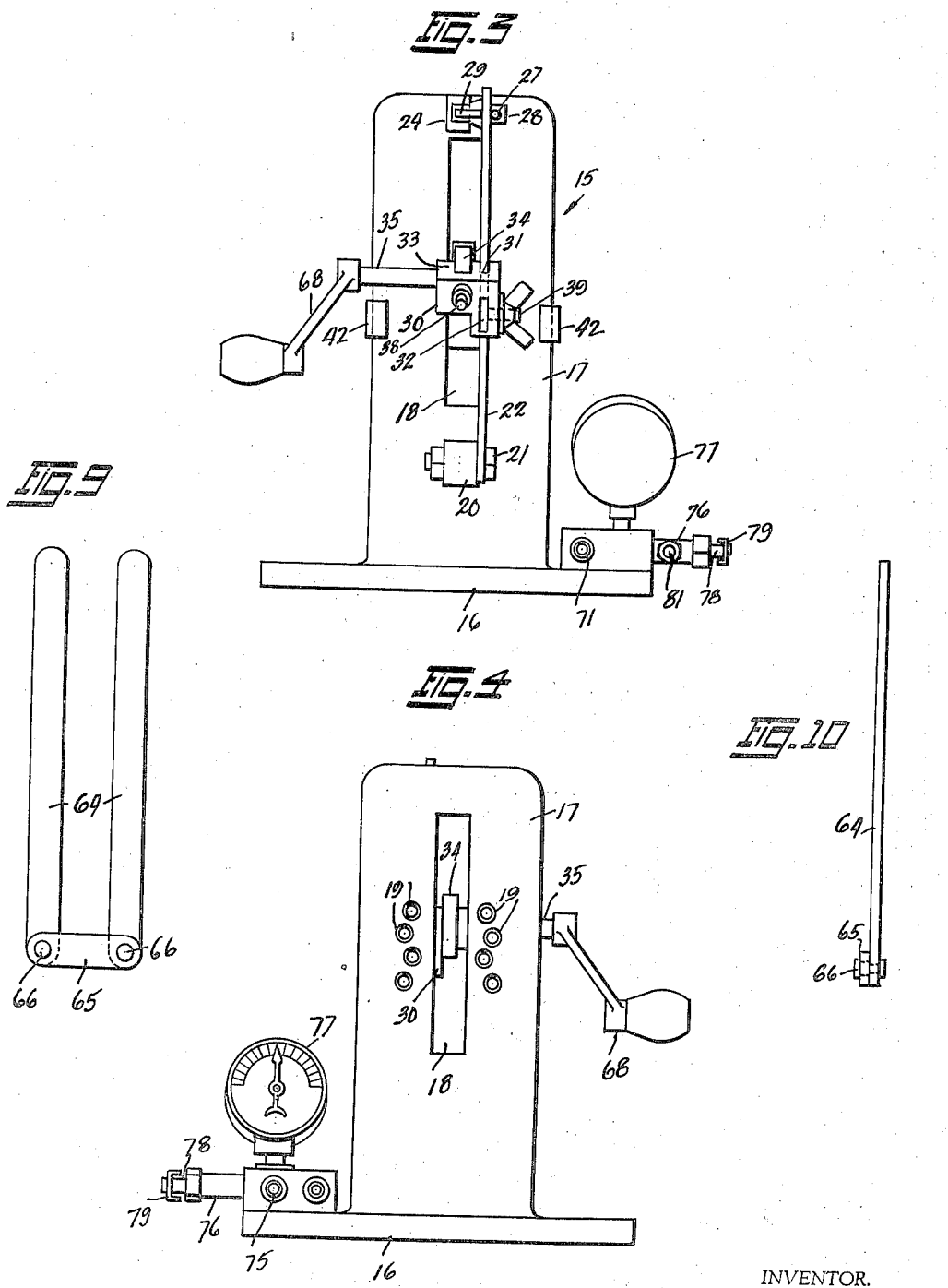
INVENTOR.
Milton F. Mac Bride
BY Joshua E. Davidson
ATTORNEY.

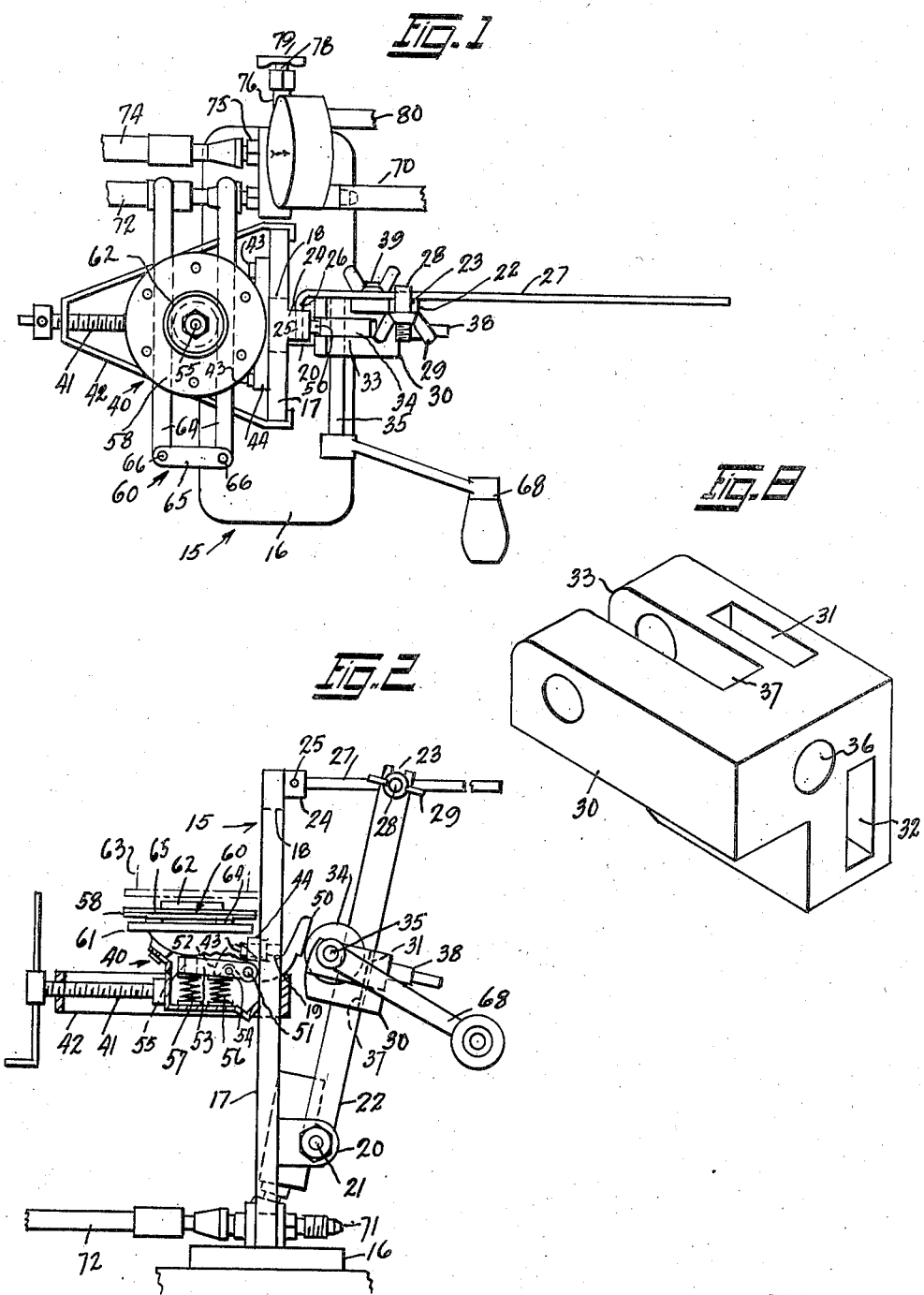

Jan. 31, 1939.  M. F. MacBRIDE  2,145,401
TESTING GAUGE FOR MOTOR VEHICLE FUEL PUMPS
Filed Nov. 9, 1937  3 Sheets-Sheet 3
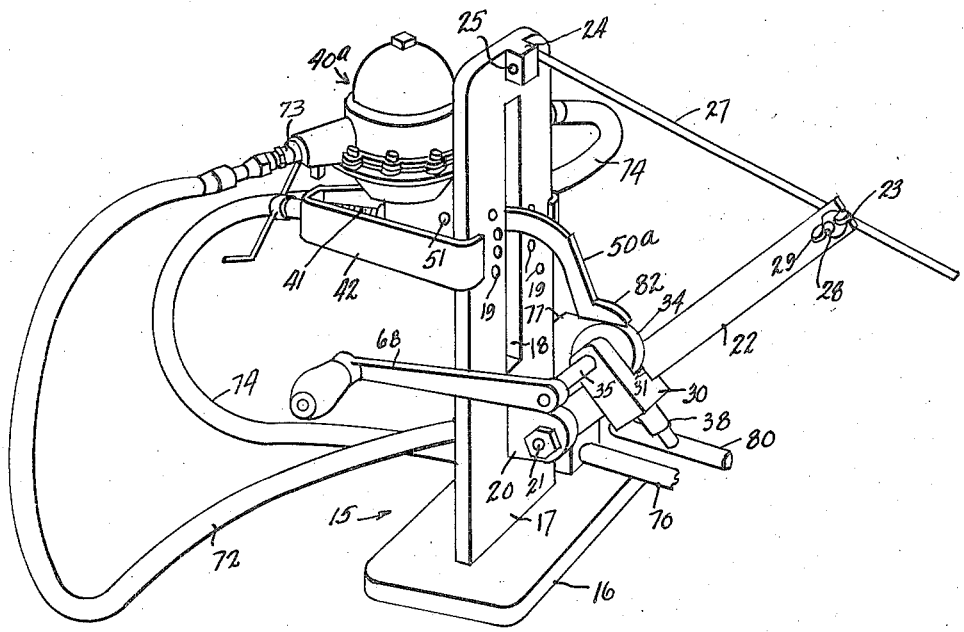
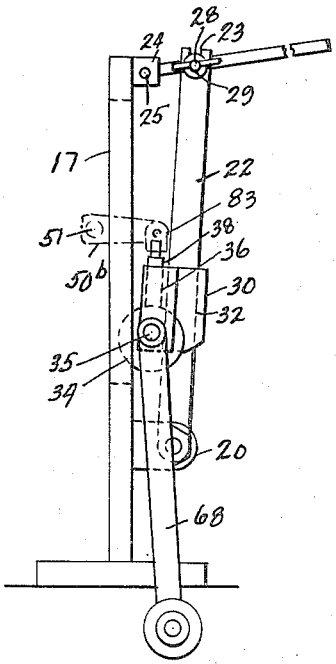
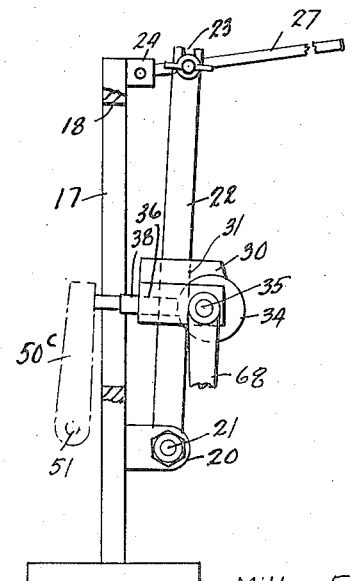
INVENTOR.
Milton F. Mac Bride
BY Joshua E. Davidson
ATTORNEY.

Patented Jan. 31, 1939

2,145,401

UNITED STATES PATENT OFFICE 2,145,401

TESTING GAUGE FOR MOTOR VEHICLE FUEL PUMPS

Milton F. MacBride, Brooklyn, N. Y., assignor to Charles Zimmer, Brooklyn, N. Y.

Application November 9, 1937, Serial No. 173,564

6 Claims. (Cl. 73—51)

This invention relates to testing fixtures or gauges for motor vehicle fuel pumps and has for one of its objects the provision of a device of the character referred to which is adapted to have secured thereto any of the various types or models of fuel pumps now commonly used for the purpose of testing the pump after it is assembled.

Another object of the invention is the provision of a device of this nature, wherein the pumps may be tested under normal actual operating conditions existing in the motor vehicle in connection with which they may be used.

A further object of the invention is the provision of gauge of this character, the said gauge comprising a support to which any of the various types of pumps may be secured, and adjustably mounted testing means whereby the said pumps may be tested, either during the manufacture or after they have been repaired.

A still further object of the invention is the provision of a device of the nature referred to comprising a support for receiving the pump to be assembled and tested, a pivotally mounted bar adapted to be swung into desired position, a testing cam and pin carrying block adjustably mounted on the said bar for operating the pump under normal vehicle running conditions, and a pressure gauge connected to the pump and to a fuel supply to indicate the pressure exerted by the pump.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In the accompanying drawings:

Figure 1 is a top plan view of my improved assembling and testing gauge showing a pump in the act of assembly;

Figure 2 is a side view thereof partly in section;

Figure 3 is a rear view of the device;

Figure 4 is a front view with the pump removed;

Figure 5 is a perspective view of the gauge with a pump secured in place for testing, the said pump being of a different type than that shown in Figures 1 and 2;

Figure 6 is a side view of the testing device showing in dot and dash lines a fragment of a still different type of pump rocker arm connected to the testing device;

Figure 7 is a similar view to Figure 6 showing in dot and dash lines a rocker arm of still another type of pump being tested;

Figure 8 is a perspective view at a larger scale of the cam and pin carrying block;

Figure 9 is a top plan view of the diaphragm setting gauge and

Figure 10 is a side view thereof.

Referring now to the drawings in detail 15 indicates a standard or support comprising a base 16 and an upright wall 17 provided with a central longitudinal slot or opening 18. The said wall 17 is further provided with a plurality of stud-receiving openings or holes 19, the said holes being so arranged that any of the various types of motor vehicle fuel pumps may be secured to the wall 17.

Projecting rearwardly from the wall 17 is a boss 20 to which is pivotally mounted at 21 a bar or link 22 provided at the top thereof with a slot 23. The rear wall is further provided with an upper extension or boss 24 having a hole or opening 25 to receive the hooked end 26 of a rod 27 which carries a slidable stud 28 which is adapted to be received in the slot 23 of the bar 22 and tightened in place by a wing nut 29.

Slidably mounted on the bar 22 is a block 30 having a vertically extending slot 31 for the reception of the bar 22 when testing some types of fuel pumps and a horizontally extending slot 32 for the reception of the said bar 22 when testing other types of such pumps. The said block 30 is further provided with a bifurcated end 33 for the reception of a cam 34 mounted on a shaft 35 journaled in the said bifurcated end 33. An opening or hole 36 extends from the rear end of the block 30 and opens into the slot 31 forming the bifurcated end 33. A shouldered pin 38 is slidably mounted in the said hole 36. The block 30 is maintained in position on the bar 22 by means of a bolt 39.

In Figures 1 and 2 I have shown the lower portion 40 of one form of motor vehicle fuel pump as clamped against the wall 17 by means of a screw 41 passing through a strap 42 which engages the rear of the said wall. The said pump section 40 is located on the wall 17 by means of studs 43 which pass through the securing holes of the base 44 and through a pair of the holes 19 in the wall 17, one on each side of the slot 18. The pump here illustrated is provided with a rocker arm 50 which is mounted at 51 and has an inwardly extending portion 52 which connects same to a link 53 by means of a pin 54. The link 53 is also pivoted at 51 at one end and at its opposite end is connected to the diaphragm carrying stud 55. The rocker arm 50 is under the tension of a coiled spring 56 and the link 53 and diaphragm stud 55 is under the tension of a similar spring 57.

It is highly essential that the diaphragm 58 which is of the flexible laminated type is properly positioned and tensioned within the pump. It will readily be understood that if the said diaphragm is too tight it will eventually tear or break, likewise if too loose it will wrinkle and tear or break. In order to avoid these undesirable conditions, I have devised means for properly setting the diaphragm when assembling the pump. The method and means of properly setting or tensioning the diaphragm consists in placing a gauge 60 upon the flange 61 of the lower pump casing section 40 directly beneath the diaphragm and within the area of the metallic disc 62 carried at the upper end of the diaphragm post 55, then swinging the bar 22 forwardly and bringing the heel or lowest portion of the cam 34 against the rocker arm 50 and swinging same until the hooked end 52 of the said arm is in engagement with the pin 54 and all play between the diaphragm 58 and gauge 60 is taken out. The bar 22 is then locked in position by means of the wing nut 29, and the upper casing section 63 partially shown in Figure 2 in dot and dash lines may be screwed or secured in position after the gauge 60 has been removed. The said gauge 60 comprises a pair of bars 64 pivotally connected at one end by a link 65 and a pair of studs 66. The thickness of the bars 64 being such that they will locate or set the diaphragm at the uppermost point of its movement.

The reason why gauge 60 will properly locate the diaphragm 58, is that the thickness of the bars 64 are equal to one-half the entire distance of the up and down movement of the diaphragm, thus dividing the strain on the said diaphragm equally between the uppermost and lowermost limits of the movement thereof. In other words after the gauge 60 is removed from the pump and the upper casing section 63 is secured in place, the diaphragm 58 will have a central upward bulge of one-half the distance of the entire movement thereof, and an equal downward sag when the said diaphragm is brought to its lowermost position by the operation of the cam on the cam shaft.

With the pump fully assembled it is ready for testing, such testing being accomplished by rotating the cam shaft 35 by means of the handle 68 secured thereto, the said shaft 35 being the equivalent to the crank shaft of the motor vehicle and the cam 34 being a duplicate of the cam of such vehicle. During the rotation of the cam shaft 35 liquid fuel is permitted to enter the pump from a tank not shown through a tube 70 connected to an inlet 71 from whence it passes through a tube 72 which is connected to the intake side 73 of the pump and passes out the pump through a tube 74 which is in direct connection by means of connection 75 with a short nipple 76 and a pressure gauge 77. Located within the nipple 76 is a valve 78 of the needle type similar to the needle valve used in the motor vehicle carburetor. The said valve is disposed on the return or pressure side of the pump between the pressure gauge and the source of fuel supply. When testing the pump the valve 78 is closed, such closing being accomplished by turning the thumb or fingerpiece 79. If the proper or rated pump pressure is indicated on the pressure gauge 77 then the pump is in proper working order, if it is more or less, then the pump is imperfect and has to be checked for either leaky joints, or the springs 56 and 57 have to be replaced, they being either too heavy or too light. The fuel passes out of the device through a tube 80 connected to a fitting 81 on the nipple 76.

In Figure 5 of the drawings I have shown a pump 40$^a$ as secured to the wall 17 said pump having a rocker arm 50$^a$ provided with a horizontally extending cam engaging projection 82. In this form of the invention the cam presses against the said extension 82 from underneath and the bar 22 and block 30 are adjusted to meet the conditions required by this construction otherwise the operation for setting the diaphragm and testing the pump is identical with that above described.

In Figure 6 the rocker arm 50$^b$ forms a part of what is known as the push rod type of pump. In this instance the block 30 is mounted on the bar 22, the said bar passing through the horizontal slot 32 and maintained in adjusted position thereon by means of the bolt 39 which as shown in Figure 3 is in direct communication with both of the slots 31 and 32 the said slots crossing one another at right angles. In this form of my invention movement from the cam to the rocker arm 50$^b$ is transmitted through the pin 38 which contacts the said cam 34 and fits into a connection 83 at the free end of the rocker arm 50$^b$. It is to be understood that to eliminate the lost motion between the rocker arm 50$^b$ and the diaphragm controlling link (not shown) the block 30 is slid upwardly upon the bar 22 and then tightened in place, otherwise the operation is the same as previously described.

In Figure 7, I have shown my device as testing a pump provided with an upstanding rocker arm 50$^c$. In this instance the block 30 is reversed from the position shown in Figures 1, 2 and 3 and the pin 38 extends inwardly through the slot 18 in the wall 17 and contacts the free end of the rocker arm both for setting the diaphragm and testing the operation of the pump.

From the foregoing it will be seen that I have provided a simple yet highly efficient gauge for use in assembling and testing motor vehicle fuel pumps.

Having described my invention what I claim as new and desire to secure by Letters Patent is:

1. A devce for testing motor vehicle fuel pumps having a diaphragm rocker arm, said device comprising a support for securing a pump thereto, a bar pivoted at one end thereof to the support, a rod pivotally mounted on the support to which rod the other end of the bar is adapted to be adjustably secured, a block slidably mounted on the bar, a shaft journaled on the said block, a cam secured to the shaft for contacting and actuating the said rocker arm, and a handle for revolving the said shaft and cam.

2. A device for testing motor vehicle fuel pumps having a diaphragm rocker arm, said device comprising a support for securing a pump thereto, rocker arm actuating means adjustably mounted on the said support for bringing same into contact with the rocker arm, said actuating means comprising a bar pivoted at one end thereof to the support, a rod pivotally mounted on the support to which rod the other end of the bar is adapted to be adjustably secured; means for operating said actuating means, a fuel pressure gauge connected to the pump for registering the pressure in the pump while the rocker arm is being actuated and a valve in communication with the pressure gauge for shutting off the flow of fuel when testing the pump so that the pressure developed by the pump may register on the gauge.

3. A device for testing motor vehicle fuel pumps having a diaphragm rocker arm, said device comprising a support for securing a pump thereto, a bar pivoted at one end thereof to the support, a rod pivotally mounted on the support to which rod the other end of the bar is adapted to be adjustably secured, rocker arm actuating means adjustably mounted on the bar to bring same into contact with the rocker arm, means for operating said actuating means, and a fuel pressure gauge connected to the pump as and for the purpose specified.

4. A device for testing motor vehicle fuel pumps having a diaphragm rocker arm, said device comprising a support for securing a pump thereto, a bar pivoted at one end thereof to the support, a rod pivotally mounted on the support to which rod the other end of the bar is adapted to be adjustably secured, a block slidably mounted on the bar, a shaft journaled on the said block, a cam secured to the shaft for contacting and actuating the said rocker arm, a handle for revolving the said shaft and cam, and a fuel pressure gauge connected to the pump as and for the purpose specified.

5. A device for testing motor vehicle fuel pumps having a diaphragm rocker arm, said device comprising a support for securing a pump thereto, a bar pivoted at one end thereof to the support, a rod pivotally mounted on the support to which rod the other end of the bar is adapted to be adjustably secured, a block slidably mounted on the bar, a shaft journaled on the said block, a cam carried by the said shaft, a pin slidably mounted on the block in engagement with the cam for transmitting movement therefrom to the rocker arm, and means for rotating the said shaft and cam to actuate the rocker arm.

6. A device for testing motor vehicle fuel pumps having a diaphragm rocker arm, said device comprising a support for securing a pump thereto, a bar pivoted at one end thereof to the support, a rod pivotally mounted on the support to which rod the other end of the bar is adapted to be adjustably secured, a block slidably mounted on the bar, a shaft journaled on the said block, a cam carried by the said shaft, a pin slidably mounted on the block in engagement with the cam for transmitting movement therefrom to the rocker arm, means for rotating the said shaft and cam to actuate the rocker arm, and a pressure gauge connected to the pump as and for the purpose specified.

MILTON F. MacBRIDE.